Figure 1:
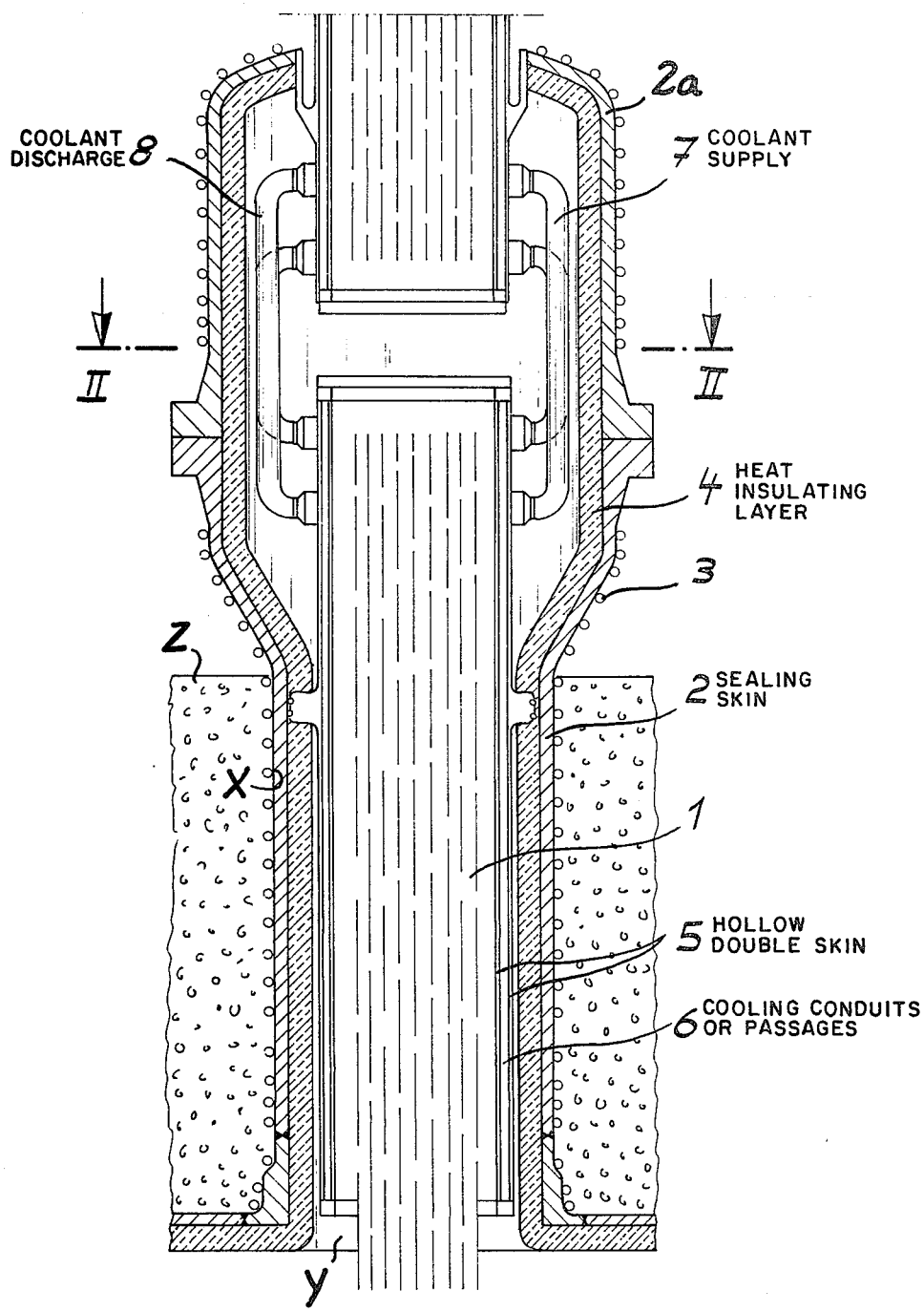

United States Patent [19]

Dörling et al.

[11] 4,236,573
[45] Dec. 2, 1980

[54] HIGH-TEMPERATURE GAS EXIT FROM A PRE-STRESSED PRESSURE CONTAINER

[75] Inventors: Rolf Dörling; Hans Hemshemeier, both of Gummersbach, Fed. Rep. of Germany

[73] Assignee: L. & C. Steinmüller GmbH, Gummersbach, Fed. Rep. of Germany

[21] Appl. No.: 960,833

[22] Filed: Nov. 15, 1978

[30] Foreign Application Priority Data

Nov. 15, 1977 [DE] Fed. Rep. of Germany ....... 2750968

[51] Int. Cl.³ .......................................... F28F 13/00
[52] U.S. Cl. ................................. 165/54; 165/134 R; 165/136; 165/140; 165/169; 176/87
[58] Field of Search .............. 165/140, 141, 134, 135, 165/136, 53, 55, 169, 47, 54; 176/87, 38

[56] References Cited

U.S. PATENT DOCUMENTS

| | | | |
|---|---|---|---|
| 3,000,364 | 9/1961 | Steever | 165/134 |
| 3,059,908 | 10/1962 | Fox et al. | 165/134 |
| 3,301,320 | 1/1967 | Huntington | 165/136 |
| 3,357,890 | 12/1967 | Friis et al. | 165/136 |
| 3,443,631 | 5/1969 | Bremer et al. | 165/134 |
| 3,497,421 | 2/1970 | Thome | 165/136 |
| 3,834,452 | 9/1974 | Costes | 165/134 |

FOREIGN PATENT DOCUMENTS

| | | | |
|---|---|---|---|
| 2753796 | 6/1978 | Fed. Rep. of Germany | 165/134 R |
| 619158 | 3/1949 | United Kingdom | 165/140 |

*Primary Examiner*—Sheldon Richter
*Attorney, Agent, or Firm*—Becker & Becker, Inc.

[57] ABSTRACT

A high-temperature gas exit in the form of a pipe bundle from a pre-stressed cast or concrete pressure container with a first cooling system comprising a sealing skin having cooling pipes arranged on the outside thereof and with a thermal insulation layer arranged on the inner side of the sealing skin. Between the first cooling system and the pipe bundle there is provided a second cooling system comprising a hollow double skin with cooling passages, the first cooling system and the second cooling system being independent of each other.

2 Claims, 2 Drawing Figures

HIGH-TEMPERATURE GAS EXIT FROM A PRE-STRESSED PRESSURE CONTAINER

The present invention relates to a high-temperature gas exit in the shape of pipe bundles from a pre-stressed pressure container designed as cast or concrete structure which is provided with a cooling system located on the inner side of the perpretration and comprises a sealing skin with cooling pipes arranged on the outside thereof and with a thermal insulation layer arranged on the inner side thereof.

With gas exits or gas discharges of the above mentioned type, there exists now as before the problem of an insufficient heat accumulation in the direction toward the concrete or cast mantle. This causes intolerable temperature loads, especially in the concrete mantle.

It is, therefore, an object of the present invention with high-temperature gas exits, so to design the there existing cooling system that during operation, the temperature load of the concrete or cast mantle of the exit or outlet be kept in permissible limits.

These and other objects and advantages of the invention will appear more clearly from the following specification in connection with the accompanying drawings, in which:

FIG. 1 diagrammatically illustrates a high temperature gas exit according to the invention in the form of a pipe bundle or pipe assembly with a concrete mantle.

Figure 2:
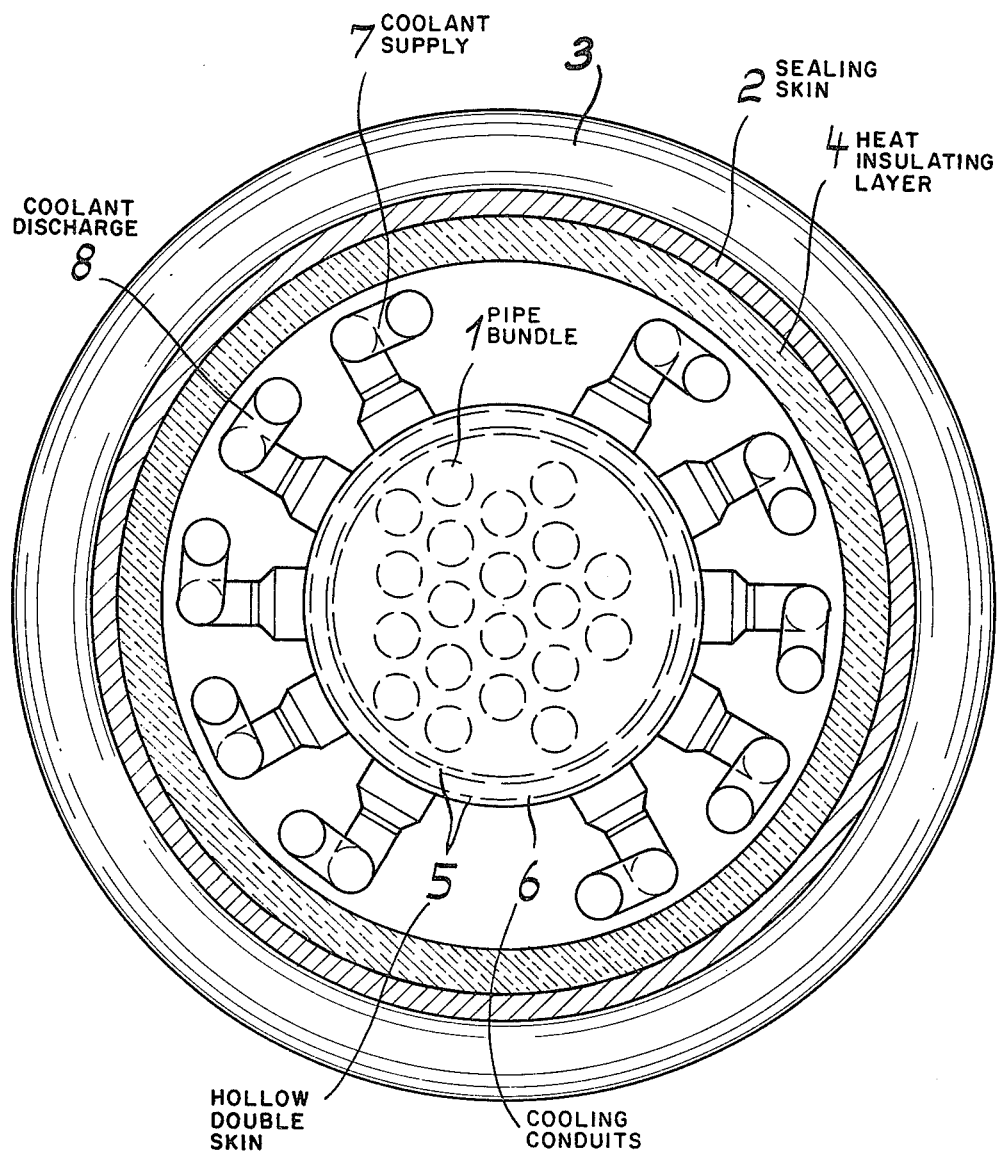

FIG. 2 represents a horizontal section taken along the line II—II of FIG. 1 but on a larger scale than that of FIG. 1.

The high temperature gas exit according to the present invention is characterized primarily in that between a first cooling system and the pipe bundle or pipe assembly there is provided a second cooling system comprising a hollow double skin with cooling passages, the first cooling system and the second cooling system being independent of each other.

Referring now to the drawings in detail, the high-temperature gas exit comprises a pipe bundle or pipe assembly 1. The thermal screening toward the outside is effected by a first cooling system which comprises a sealing skin or sealing casing 2 with cooling pipes 3 located on the outside of the sealing skin, and an insulating layer 4 on the inside of said sealing skin 2. As is seen in FIG. 1, the sealing skin or sealing casing 2 surrounds the pipe bundle or pipe assembly 1 and is in sealing engagement with the surface of the opening through which the pipe bundle passes. Moreover, the sealing casing 2 has a portion 2a which extends past the wall. The cooling pipes 3 are also positioned around the portion 2a which extends past the wall. This first cooling system is according to the invention supplemented by a second cooling system which comprises a hollow double skin or jacket 5 with cooling passages 6 which double skin 5 surrounds the pipe bundle 1 in close proximity thereto. There is a space between the hollow double skin 5 or jacket and the insulating layer 4. By the aforedescribed structure, the cylindrical surface x which defines the opening y through the wall z is shielded from the heat eminating from pipe bundle 1.

There are provided at least two cooling medium inlet conduits 7 and two cooling medium outlet conduits 8. In the specific embodiment shown in the drawings, these cooling medium inlet and outlet conduits 7 and 8 are coupled to an additional high-temperature gas exit with a corresponding cooling system as mentioned above, corresponding to the first and second cooling systems and coupled to the at least two inlet and outlet conduits 7, 8. The cooling medium inlet and outlet conduits 7, 8 comprise double walled pipes so that in the interior there flows the high-temperature gas and in the outer high-temperature passage there flows the cooling medium.

As will be evident from the above, the high-temperature gas exit according to the invention assures the required safety screen relative to the atmosphere.

More specifically, the high-temperature gas exit in the form of a pipe assembly is in conformity with the heat flow relative to its mantle of concrete or cast material screened in such a way that harmful heat overloads will no longer occur. This has a favorable effect upon the supporting capability of the concrete mantle as well as upon the frictional stresses exerted upon the sealing skin.

It is, of course, to be understood that the present invention is, by no means, limited to the specific showing in the drawings, but also comprises any modifications within the scope of the appended claims.

What we claim is:

1. A high temperature gas exit conduit in the form of a pipe bundle means in combination with and extending through an opening in a wall of a pre-stressed, concrete pressure container, the combination comprising:
    a surface defined by the opening, said surface extending through the thickness of the wall;
    a casing surrounding the bundle and in sealing engagement with the entire surface of the opening, said casing having a portion extending past the wall;
    cooling pipe means disposed both between the surface of the opening and the casing on that portion of the casing extending past the wall;
    a layer of thermal insulation lining the entire inner surface of the casing and surrounding the pipe bundle, and
    additional cooling means, independent of said cooling pipe means, and surrounding and in close proximity to the pipe bundle means, said additional cooling means being in spaced relation to the layer of thermal insulation.

2. A high-temperature gas exit according to claim 1, which includes in combination: at least two inlet conduits and two outlet conduits for a cooling medium, said inlet and outlet conduits comprising double walled pipes, and an additional high-temperature gas exit comprising a cooling arrangement corresponding to said first and second cooling systems and coupled to said at least two inlet and outlet conduits.

* * * * *